UNITED STATES PATENT OFFICE.

LORIN B. SEBRELL AND CLAYTON W. BEDFORD, OF AKRON, OHIO, ASSIGNORS TO THE GOODYEAR TIRE & RUBBER COMPANY, OF AKRON, OHIO, A CORPORATION OF OHIO.

ART OF MANUFACTURING THIAZOLS.

No Drawing. Original application filed December 7, 1921, Serial No. 520,689. Divided and application filed November 30, 1923, Serial No. 677,877, Patent No. 1,544,688, dated July 7, 1925. Divided and this application filed April 12, 1924. Serial No. 706,079.

This application is a division of application Serial Number 677,877, Patent No. 1,544,688, issued July 7, 1925.

Our invention relates to accelerators of the vulcanization of rubber and it has, for its primary object, the provision of accelerators of high curing power, which may be prepared in a manner best adapted to facilitate their production.

In Patents Numbers 1,371,662; 1,371,663 and 1,371,664, issued March 15, 1921, a number of accelerating reagents are described as the reaction products of sulfur and nitrogen-containing bodies. In this application is is our desire to set forth specific ingredients, or reagents, which are especially active accelerators and which result from reactions of sulfur with thiocarbanilid.

As set forth in the above mentioned patents, accelerators of considerable commercial value may be prepared by effecting certain reactions, such as the reaction of sulfur with thiocarbanilid, before the chemicals are incorporated in the rubber mix and subjected to the heat of vulcanization. By establishing proper conditions of temperature and admixture of the reacting materials, a satisfactory accelerator is assured, whereas during vulcanization, such ideal conditions might not obtain.

By our present invention we disclose the specific reaction products which are responsible for the high curing power of the reaction products of sulfur with thiocarbanilid. The desired accelerators may, consequently, be more efficiently produced and utilized to best advantage, by their isolation and use in a pure or semi-pure state.

It will be appreciated, of course, that the class of reactions involved in this preparation is not unlike many others in that its rate may be accelerated either negatively or positively by an appropriate variation in temperature or pressure, or both. Thiocarbanilid may be assumed to be an equilibrium with its tautomeric form

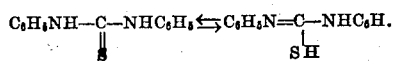

This tautomeric form may occur as two geometric isomers A and B respectively.

When B is sulfurized and aniline eliminated, 1-mercaptobenzothiazol is formed, as shown by the following reaction:

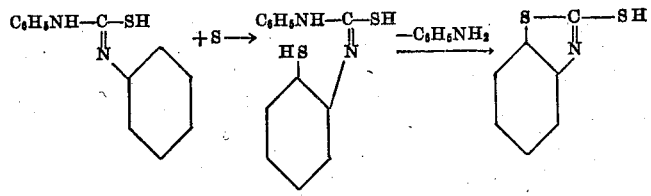

If this reaction is carried out under positive pressure, the two products, namely aniline and the aryl thiazole will account for from 90 to 95 percent of the thiocarbanilid utilized.

Jacobson and Frankenbaker, Ber. 24, 1400 (1891), and others, have described mercaptobenzothiazol.

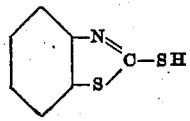

as the sulfur reaction product of phenyl mustard oil

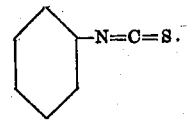

It is also well known that thiocarbanilid decomposes under the influence of heat into phenyl mustard oil and aniline. We have found that both of these reactions occur when thiocarbanilid is heated with sulfur and that the chief reaction products are mercaptobenzothiazol and aniline. Anilidobenzothiazol, thioanilines, hydrogen sulfide, carbon bisulfide and other products are also formed.

We have also discovered that an excess of sulfur oxidizes mercaptobenzothiazol to form benzothiazyl disulfide,

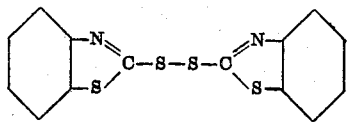

which in turn dissolves sulfur to form polysulfides, the probable formula of which is as follows:

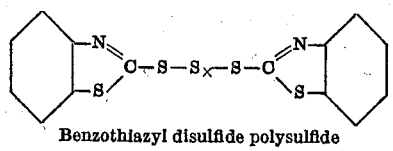

Benzothiazyl disulfide polysulfide

Extensive experiments have definitely established that the free mercaptan, its normal or basic lead or zinc salts, its disulfide or disulfide polysulfide are all desirable accelerators for the vulcanization of rubber by sulfur. Furthermore, depending upon the rubber compound in which they are to be utilized, they may be isolated and employed in a pure or nearly pure condition. The reaction products of thiocarbanilid and sulfur may be separated from aniline before their use, or they may be utilized without isolating any of the resulting constituents.

It has also been determined that mercaptobenzothiazol will react further with sulfur and that a second substitution of sulfur in the nucleus may occur. If this sulfuration process is not permitted to proceed too far, an accelerator of high power may still be obtained.

In order to illustrate the merits of accelerators prepared in accordance with our invention, we have vulcanized rubber under different degrees of steam pressure and tested the physical properties of the resulting products. In addition to comparing the accelerators with each other, such tests prove the desirability of such accelerators with respect to similar reagents known to those familiar with the art.

In the following chart is shown the time required to cure rubber at 20 pounds and 40 pounds of steam pressure. Although the usual curing temperature adopted is represented by 40 pounds steam pressure, the lower steam pressure was also utilized because the trend of present day practice is to reduce the temperature.

In the following examples, a mixture was utilized which consisted of:

| | Parts. |
|---|---|
| Smoked sheet | 100 |
| Zinc oxide | 5 |
| Sulfur | 3.5 |

One part of mercaptobenzothiazol was used and equivalent proportions of its derivatives to correspond to one molar weight of the original mercaptan.

| | Optimum cure | | Maximum tensile strength | | Load to give 700% elongation | |
|---|---|---|---|---|---|---|
| Steam press | 20 lbs | 40 lbs | 20 lbs | 40 lbs | 20 lbs | 40 lbs |
| Mercaptobenzothiazol | Hrs. min 1 30 | Hrs. min 0 30 | $Kg/cm^2$ 210 | $Kg/cm^2$ 200 | $Kg/cm^2$ 160 | $Kg/cm^2$ 110 |
| Zinc salt of mercaptobenzothiazol | 1 00 | 0 15 | 240 | 210 | 220 | 210 |
| Lead salt of mercaptobenzothiazol | 1 00 | 0 15 | 210 | 190 | 210 | 190 |
| Benzothiazyl-disulfide | 1 30 | 0 30 | 180 | 170 | 150 | 110 |

The fact that the above accelerators may be isolated from the reaction products of sulfur and nitrogen-containing bodies permits of their purification, which aids in reducing the length of time necessary to effect the best cure, as well as to avoid the softening action of the thioanilines which otherwise are present.

Although we have specifically described accelerators that may be utilized in promoting the vulcanization of rubber and stated our theories with regard thereto, it is obvious that minor changes may be made in the application of the principles of our invention without departing from the spirit and scope thereof and we desire, therefore, that only such limitations shall be imposed as are indicated in the appended claims.

What we claim is:—

1. A method of making thiazols that comprises heating its corresponding substitute thiourea in the presence of sulfur.

2. A method of making aryl thiazols that comprises heating an aryl substituted thiourea in the presence of sulfur.

3. A method of making a mercaptoarylthiazol that comprises heating under positive pressure an aryl substituted thiourea in the presence of sulfur.

4. A method of making 1 mercaptobenzothiazol that comprises heating thiocarbanilid in the presence of sulfur.

5. A method of making mercaptobenzothiazol that comprises heating under positive pressure thiocarbanilid with sulfur.

6. A method of making mercaptobenzothiazol disulfide that comprises heating thiocarbanilid in the presence of sulfur to form mercaptobenzothiazol, and then heating the mercaptobenzothiazol in the presence of an excess of sulfur.

7. A method of making mercaptobenzothiazol disulfide polysulfide that comprises heating thiocarbanilid in the presence of an amount of surfur in excess of that sufficient to form mercaptobenzothiazol.

In witness whereof we have hereunto signed our names.

LORIN B. SEBRELL.
CLAYTON W. BEDFORD.